United States Patent [19]

Silva

[11] Patent Number: 5,987,035
[45] Date of Patent: Nov. 16, 1999

[54] PROCESS FOR SIGNALING MESSAGES IN A DATA SWITCHING NETWORK

[75] Inventor: Michael Silva, South Dartmouth, Mass.

[73] Assignee: Excel Switching Corporation, Hyannis, Mass.

[21] Appl. No.: 08/754,231

[22] Filed: Nov. 20, 1996

[51] Int. Cl.⁶ .................................................. H04J 3/12
[52] U.S. Cl. ......................... 370/467; 370/522; 379/230
[58] Field of Search ................................. 370/250, 401, 370/402, 522, 465, 467, 524, 474, 426; 379/230, 229, 242

[56] References Cited

U.S. PATENT DOCUMENTS 5,392,328  2/1995  Schmidt et al. ........................... 370/10
5,586,177  12/1996 Farris et al. .............................. 379/230
5,592,530  1/1997  Brockman et al. ....................... 370/250

*Primary Examiner*—Chau Nguyen
*Attorney, Agent, or Firm*—Cesari and McKenna, LLP

[57] ABSTRACT

A signaling system embodying the invention includes, at each SSP, a signaling unit containing a message configuration template containing an entry for each type of message. Each entry contains the complete format for the corresponding message type. For incoming messages, the signaling unit also includes, for each voice channel (CIC) multiple finite state machines which manage operations associated with each of the message types that are involved in CIC control. When a message is received, the message type field in the message is used to identify the message type and invoke the operation of the associated state machine. The state machine then parses the message and performs the operations required by the message.

3 Claims, 5 Drawing Sheets

ISUP - INTEGRATED SERVICES USER PART
       (ISDN USER PART)
TCAP - TRANSACTION CAPABILITY APPLICATION PART
SCCP - SIGNALING CONNECTION CONTROL PART
MTP  - MESSAGE TRANSFER PART

Message ID
Message Priority
Number of Mandatory Fixed (MF) parameters (x)
    MF[0] parameter ID
    MF[0] parameter length
    ...
    MF [x-1] parameter ID
    MF [x-1] parameter length Number of Mandatory Variable (MV) parameters (y)
    MV[0] parameter ID
    MV[0] parameter minimum length
    MV[0] parameter maximum length MV[y-1] parameter ID
    MV[y-1] parameter minimum length
    MV[y-1] parameter maximum length Optional (OP) parameters allowed flag
Number of OP parameters (z)
    OP[0] parameter ID
    OP[0] parameter minimum length
    OP[0] parameter maximum length ...
    OP[z-1] parameter ID
    OP[z-1] parameter minimum length
    OP[z-1] parameter maximum length

FIG. 5

PROCESS FOR SIGNALING MESSAGES IN A DATA SWITCHING NETWORK

BACKGROUND OF THE INVENTION

This invention relates to a signaling unit for the control of digital communications transmitted over a switching network. More specifically, it relates to a signaling unit having a variable signaling-message repertoire used in setting up and releasing communications channels in a digital switched network such as ISDN, and also in performing various maintenance functions in the network and providing enhanced subscriber services.

The invention will be described in connection with a data network in which signaling messages are transmitted over a signaling channel and data, including digitized voice signals, are transmitted over a "CIC" channel. Access signaling is governed by a standard suite of protocols known as Signaling System No. 7 (SS7) which defines the various signaling messages, including their formats, used in call-setup and release and various other control functions. A description of SS7 is set forth in Madrases, et al., *An Overview of Signaling System No. 7*, Proceedings of the IEEE, Vol. 80, No. 4, April 1992. While SS7 provides a fairly extensive repertoire of signaling messages, it is often desirable to augment the message set with additional messages. For example, it may be desirable to provide subscriber services that are unavailable with the standard message set.

Moreover, the requirements for additional messages will vary from one network to another and it is therefore impractical to provide each Service Switching Point (SSP) with the ability to deal with all of the possible message types. Furthermore, the requirements for additional message types at any given SSP may vary from time to time. Accordingly, it is desirable to provide a system in which the signaling-message repertoire of an SSP can be initially determined and also changed from time to time, in the field, ideally by the operator of the switching system.

SUMMARY OF THE INVENTION

A signaling system embodying the invention includes, at each SSP, a signaling unit containing a message configuration template containing an entry for each type of signaling message. Each entry contains the complete format for the corresponding message type. For incoming messages, the signaling unit also includes, for each voice channel (CIC) multiple finite state machine routines which manage operations associated with each of the message types that are involved in CIC control. When a message is received, the message type field in the message is used to identify the message type and invoke the operation of the associated state machine routine. The state machine then parses the message and performs the operations required by the message.

For example, if the incoming message is an Initial Address Message (IAM) used by a remote SSP in setting up a call to a subscriber linked with the local SSP, the associated state machine routine parses the message and passes to the local switch matrix various parameters contained in the message. These include, for example, the telephone number of the called subscriber and the number of the remote subscriber who initiated the call. Based on criteria contained in the switch matrix and/or host computer communications software, e.g., whether the line to the called subscriber is busy, the matrix communicates the appropriate response to the signaling unit. The signaling unit in turn accesses the message configuration template for the template corresponding to the outgoing message, formats a message according to that template and transmits the message to the call-originating SSP.

The state machine routines are in the form of software routines executed by a central processing unit (CPU) in the signaling unit. These routines and the message configuration template are situated in a random access memory (RAM) in the unit. Accordingly, the user can easily add to the message repertoire by making a corresponding entry in the message configuration template and writing the software routine for the corresponding state machine routine. Similarly, the programming of a state machine can be simplified by means of a high-level language whose primitives invoke combinations of low-level processor functions directed to the operations of a state machine in the environment of the invention. An arrangement of this kind is described in U.S. Pat. No. 5,546,453 which is incorporated herein by reference.

The message configuration template also permits screening of incoming messages to make sure that their contents are consistent with the specified formats of those messages. A state machine that is configured to perform this task can reject messages that do not meet the specified criteria therefor and, in turn, return appropriate messages to the STP's that originated the faulty messages.

BRIEF DESCRIPTION OF THE DRAWINGS

FIG. 5 is a list of the fields contained in a template in the message configuration table shown in FIG. 4.

DETAILED DESCRIPTION OF AN ILLUSTRATIVE EMBODIMENT

Figure 1:
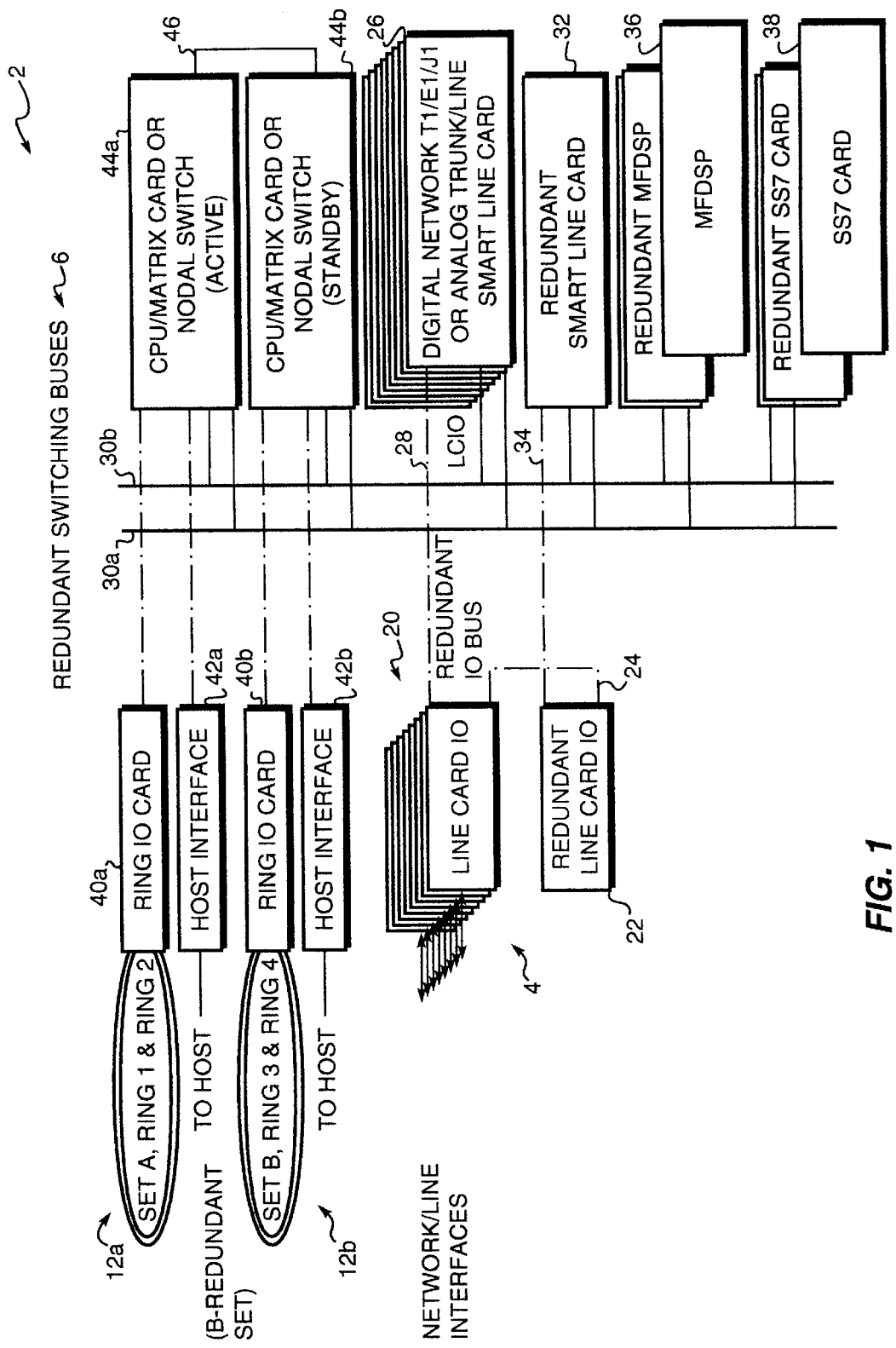
FIG. 1 is a diagram of a digital switch containing a signaling system incorporating the invention.

FIG. 1 illustrates an environment in which the present invention may operate. A programmable telecommunications switch 2 includes network/line interfaces 4, each of which may represent a link to a public switched telephone network (PSTN) or private network or a subscriber line. These interfaces are provided on a series of input/output (IO) cards 20.

One or more digital network (T1, E1, or J1) or analog trunk/line line cards 26 communicate with the IO cards 20 over line card IO bus 28. The line cards 26 are also connected in communicating relationship with redundant switching buses 30a and 30b. If desired, a redundant IO card 22 and redundant IO bus 24 may optionally be provided to permit continued operation of the switch in the event of a failure of one of IO cards 20. Again, if desired, one or more redundant line cards 32 may be provided, such redundant line cards arranged to communicate with a redundant IO card 22 over redundant LC IO lines 34. It should be understood that by providing other types of cards within the switch 2, other types of communication protocols such as DS3, SONET or others may also be supported by the switch.

Control of the operations of the switch 2, as well as the actual switching functions, are performed by a CPU/matrix card or nodal switch 44a sometimes referred to as "card/switch" hereinafter. If a CPU/matrix card is selected, the switch 2 will operate as a standalone device (i.e., as opposed to operating as a switching node in an expandable telecommunications system). In that case, the CPU/matrix card 44a is connected to a host interface 42a through which communications with an external host device (not shown) are effected.

Alternatively, if a nodal switch is selected, the switch 2 may operate as a switching node in an expandable switching system. In such an embodiment, the nodal switch is preferably connected with a ring IO card 40a through which communications with a pair of fiber optic rings 12a are effected. The nodal switch may also communicate with an external host via the host interface 42a.

Regardless of whether a CPU/matrix card or a nodal switch is selected, a matching standby a CPU/matrix card or nodal switch 44b may optionally be provided and accompanied by the appropriate host interface 42b or ring IO card 40b (or both). In such a configuration, a link 46 is provided for direct communication between active and standby devices 44a and 44b.

Details of the construction and operation of a suitable CPU/matrix card may be found in U.S. Pat. No. 5,349,579, incorporated by reference herein. Similarly, details of the construction and operation of a suitable nodal switch may be found in U.S. Pat. No. 5,544,163, also incorporated by reference herein.

Diverse, programmable communications services such as tone detection and generation, conferencing, voice recorded announcements, call progress analysis, speech recognition, ADPCM compression and many others may be provided by one or more multifunction digital signal processing (MFDSP) cards 36. SS7 signaling functions are provided by signaling units carried on one or more SS7 cards 38 incorporating the present invention. Redundant MFDSP cards 36 and redundant SS7 cards 38 may also be included.

Figure 2:
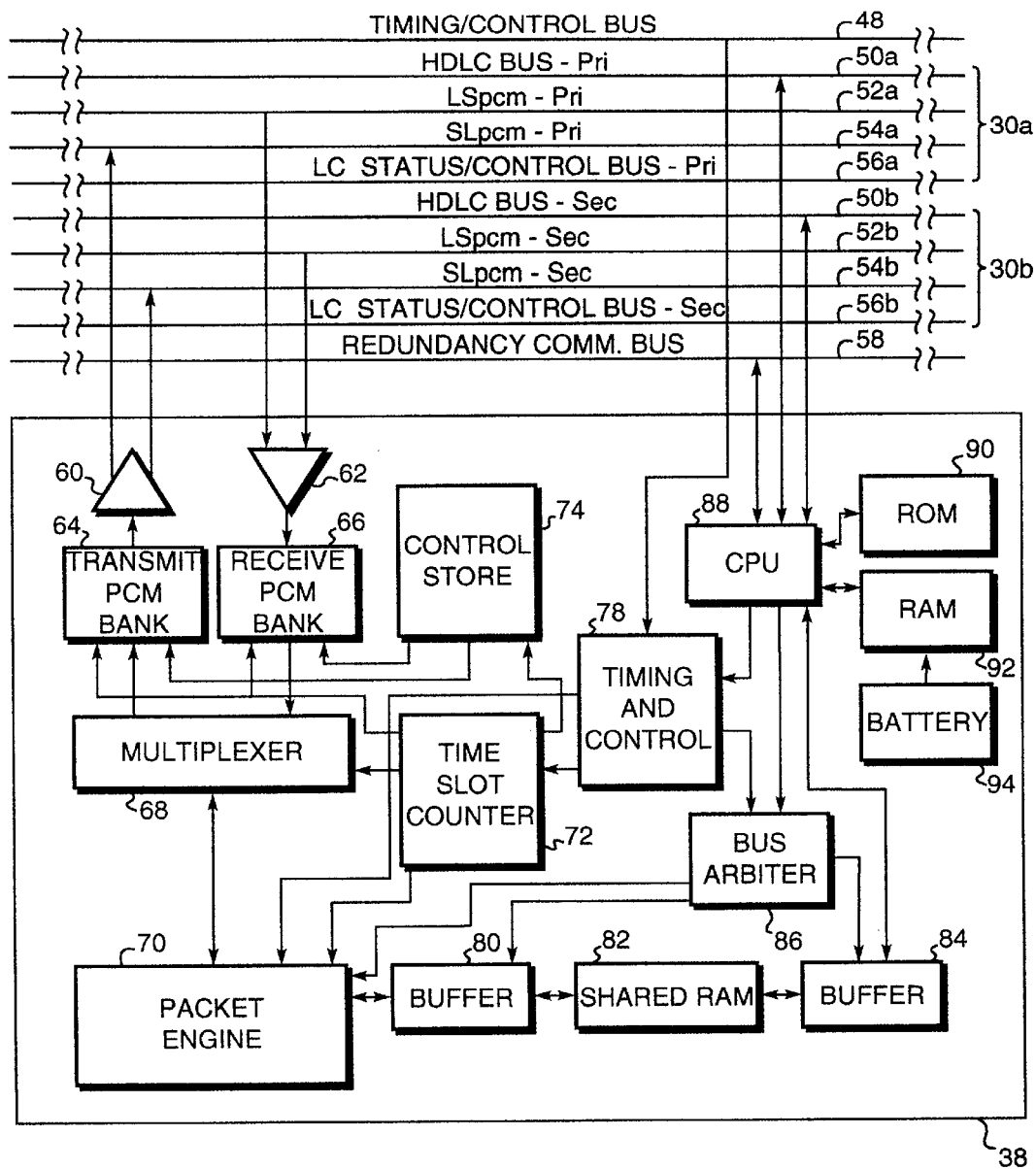
FIG. 2 is a diagram of a signaling unit incorporating the invention, included in the switch of FIG. 1.

FIG. 2 is a block diagram of an SS7 card 38. Bus driver and receiver 60 and 62, respectively, are connected in communicating relationship with a time division multiplex (TDM) bus which comprises two communication paths designated LSpcm 52a and SLpcm 54a therefore, in the bus 30a. LSpcm 52a carries pulse coded modulation information in a direction from the line cards 26 (FIG. 1) to the card/switch 44a, the MFDSP cards 36 and the SS7 cards 38. Conversely, the SLpcm 54a path carries PCM information in a direction from card/switch 44a, MFDSP cards 36 and SS7 cards 38 to line cards 26. In a preferred embodiment, two eight-bit parallel buses are used for the LSpcm 52a and SLpcm 54a, respectively. Alternatively, those paths may be implemented by a plurality of multiplexed serial buses, each of which carries a plurality of time slots. It should be understood that other types and configurations of buses may be used to establish appropriate communications between the various cards.

Preferably, paths 52a and 54a are duplicated for the purpose of providing redundancy. Accordingly, the primary bus is denoted by the suffix "a" and the redundant or secondary bus by the suffix "b".

A CPU 88, which is preferably a Motorola 68EC040 microprocessor, is connected in communicating relationship with primary and secondary HDLC buses 50a and 50b, respectively, as well as a timing and control unit 78, a buffer 84, an internal-bus arbiter 86, a read only memory (ROM) 90 containing the operating system for the card 38 and a random access memory (RAM) 92 containing applications software described below. A battery 94 provides backup power for RAM 92 so that information stored therein is preserved in the event of an interruption of the primary power supply (not shown). The SS7 card 38 receives outgoing messages from, and sends incoming messages to, the CPU/matrix card or nodal switch 44a over the HDLC bus 50a.

A transmit PCM bank 64 is connected in communicating relationship with bus drivers 60. Similarly, a receive PCM bank is connected in communicating relationship with bus receivers 62. Each of PCM banks 64 and 66 is connected to an associated control store 74 as well as to a time slot counter 72. A multiplexer 68, which is also connected to time slot counter 72, is arranged to pass PCM information bidirectionally between PCM banks 64 and 66, on the one hand, and a packet engine 70, on the other hand, which assembles incoming and outgoing message packets. A buffer 80 is connected to packet engine 70, a shared RAM 82 and the internal bus arbiter 86.

When programmed in an appropriate fashion, the SS7 card 38 may function as an SS7 server for up to 16 SS7 signaling links as well as management of up to 2048 voice channels (CICs). The timing and control unit 78 receives system timing signals from a timing/control bus 48 to synchronize operations of the SS7 card 38 to a system clock. Thus the timing and control unit 78 provides timing signals to the time slot counter 72 to time the transmission and reception of signals on the buses 52a and 54a respectively. The counter 72 also provides signals to the control store 74.

In accordance with a well-known switching arrangement, the bus paths 52a and 54a operate on a time-division-multiplex basis and for each channel handled by the switch 2, there is a corresponding time slot on the paths 52a and 54a. The PCM banks 64 and 66 and the control store 74 receive from path 52a and transmit over path 54a in the time slots corresponding with the signaling-message channels associated with the card 38.

The packet engine 70 assembles the signaling-message portions received in each channel and senses when a complete message has been assembled. It then forwards the message to the buffer 80, from which the message passes to the shared RAM 82. The CPU 8 accesses the message in the RAM 82 and processes it in accordance with software contained in the RAM 92.

When the switch 2 is initialized, the control store 74 is loaded with time slot information in accordance with the channels assigned to the card 38. Also, the RAM 92 is loaded with the software used in processing signaling messages.

Figure 3:
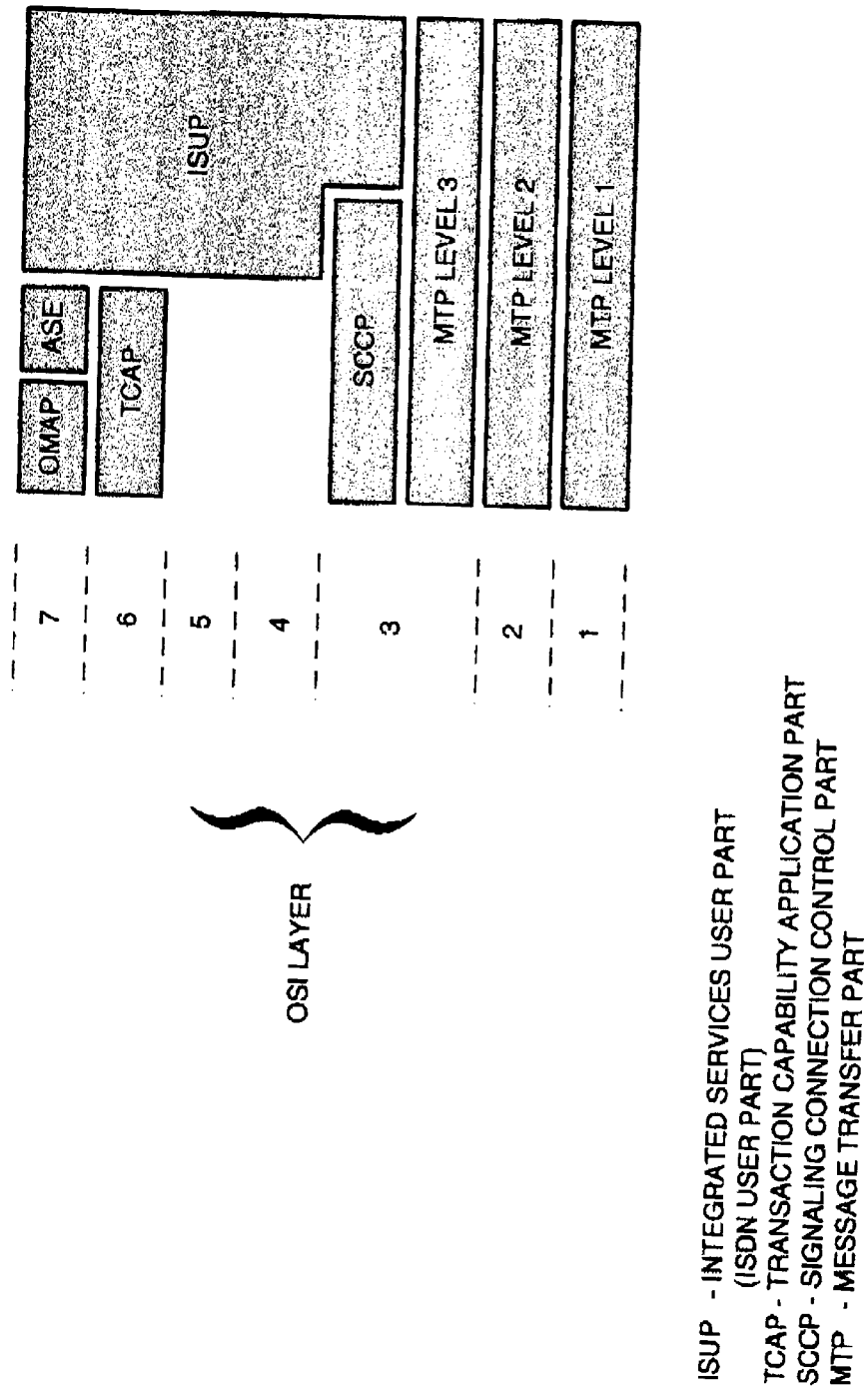
FIG. 3 is a diagram of the protocol stack used in transmitting signaling messages processed by the signaling unit of FIG. 2.

More specifically, the messages which the invention processes are in the "integrated services digital network (ISDN) user part" (ISUP) part of the SS7 signaling protocol. As shown in FIG. 3, the protocol includes, inter alia an MTP2 level, which is the data link level, and an MPT3 level, which is part of the network level in the protocol. The ISUP portion of the protocol corresponds to a portion of the network level and also to the transport and application levels.

Figure 4:
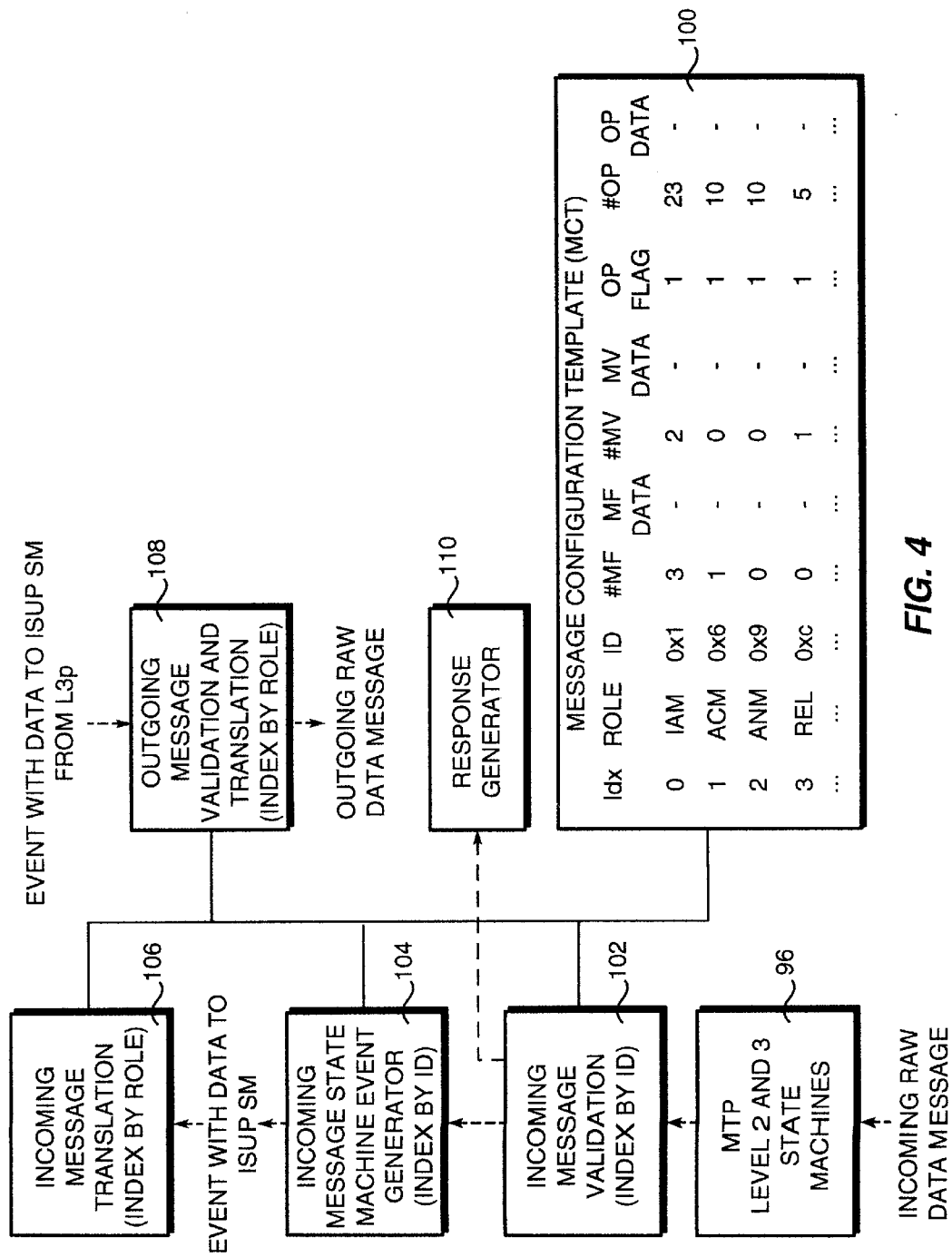
FIG. 4 is a diagram of the message processing procedure performed by the signaling unit.

As shown in FIG. 4, the software in RAM 92 contains MTP level 2 and 3 state machines 96, a message configuration template 100, an incoming-message validation unit 102, an incoming message state machine event generator 104 and incoming-message translation unit 106, all of which are used in processing incoming messages. Outgoing messages are processed by a validation and translation unit 108 in accordance with the appropriate entries contained in the message configuration template 100 and by MTP levels 3 and 2 framers (not shown). The state machine 104 is located in RAM 92, as are the units 106 and 108, which are also state machines.

The message configuration template 100 includes a template for each type of signaling message as shown in FIG. 4. With reference to FIGS. 4 and 5, each template includes: an index number (IDX); the message role; the message type; the number of mandatory fixed parameters and for each of such parameters, the parameter identification (ID) and the parameter length; the number of mandatory variable parameters and for each of those the parameter, ID the parameter minimum length and the parameter maximum length. The template also includes an optional-parameter indicator flag which, if it has a value of one, indicates that one or more optional parameters may be included. In that case the flag is followed by the number of optional parameters and, for each of the optional parameters, the parameter ID, the minimum length of the parameter and the maximum length of the parameter.

The four message types depicted in the template 100 are an IAM incoming message used in requesting a call set-up; an ACM message which is an address complete message returned to the originator of the IAM message; an ANM message which is an answered message that is returned to the IAM originator when the call is answered; and an REL message which is sent to release the CIC used in the call.

With further reference to FIG. 4, an incoming message is first processed by the MTP levels 2 and 3 state machines 96, and the resulting ISUP message is processed by the validation unit 102, which uses the type contained in the message to access the template 100 to obtain the corresponding format entry. It then compares the message with the entry to see if it has a valid format according to the retrieved format entry.

If the format is valid, the validation unit 102 passes the message to the incoming message state machine event generator 104. A single state machine may be used to parse several related messages such as the call setup messages. Accordingly, the generator 104 invokes the state machine routine to be used in parsing the message. Assuming that the message is one to which the card/switch 44a should respond, the event generator 104 selects the appropriate state machine for the translator 106 and generates an "event", i.e., invokes the appropriate routines in the unit 106 in accordance with the message type. The translation unit parses the message in accordance with the corresponding entry in the template 100 and translates it into a standard form used by the card/switch 44a in connection with all of the calls handled by the switch 2. The translated message is then s forwarded to the card/switch 44a over the HDLC bus 50a.

If the incoming message does not fit the format specified in the template 100 an appropriate response is generated by a response generator 110 and passed to the packet engine 70 (FIG. 2) for transmission back to the message originator.

Outgoing messages received from the card/switch 44a are passed to the outgoing message validation and translation unit 108, which is a state machine that converts the message into appropriate fields of an SS7 message, assembles the fields in accordance with the appropriate entry in the template 100 and passes the messages to MTP levels 2 and 3 frames (not shown) and then to the packet engine 70 for transmission to the SSP at the other end of the message channel.

The various devices depicted in FIG. 4 and, in particular, the state machines 104 and 108 and the message configuration template 100 are downloaded to the RAM 92 from the card/switch 44a by means of messages sent over the HDLC bus 50.

In addition to the standard SS7 protocol messages, the host may download configuration templates and corresponding state machines for other messages which may be desired by the system operation. These messages for example, may be used in providing various subscriber services such as call transfer. While the user can program these additions or modifications directly in the assembly language of the CPU 88 (FIG. 2), we prefer to use a higher level programming arrangement such as described in U.S. Pat. No. 5,546,453.

It will thus be seen that I have provided a highly flexible signal-message processor that can be configured in the field to handle any desired message repertoire, i.e., both messages specified in a standard such as SS7 and messages specific to the operator's switching system.

In a preferred embodiment of the invention, message processing is performed in a processing unit on a separate card plugged into a digital switch. Configuration of the unit can then be accomplished at a system console that is used to program other units in the switch. Changes in the message repertoire are readily effected by means of entries into a message configuration template located in a memory in the message processing unit and by modifications to, or additions to, a set of state machines, located in the memory.

It will be apparent that various modifications can be made to the signaling-message processor described above without departing from the scope of the invention.

What is claimed is:

1. A message processing unit for processing signaling messages of different types in a digital switching system, said message processing unit comprising;
    A. a central processor
    B. a random access memory
    C. a message configuration template contained in said memory, said configuration template containing a format template for each message type that can be processed by the unit,
    D. a plurality of state machine routines contained in said memory and run by said processor, each state machine routine;
        1. corresponding to one of said message types,
        2. parsing incoming messages of that type received from sources external to said system, and
        3. generating an event as a result of said parsing,
    E. means external to said unit for loading the message configuration template and said state machines into said random access memory, whereby the repertoire of incoming messages that can be processed by the message processing unit can be readily modified or augmented by the operator of said switching system.

2. The message processing unit defined in claim 1 further including;
    A. an incoming-message translator that translates a signaling message received from another unit in said switching system to a form compatible with an entry in said message configuration table,
    B. a state machine that assembles the message in accordance with a template in said table corresponding to the type of said message and
    C. means for transmitting the assembled message to a recipient external to said system.

3. The message processing unit defined in claim 1 in which each state machine routine:
    A. translates messages passed by it into a standard form; and
    B. transmits the translated messages to another element in the system that performs operations in accordance with the contents of messages in the standard form.

* * * * *